United States Patent Office 2,910,478
Patented Oct. 27, 1959

2,910,478

THIAZOLINES AND PROCESS FOR MANUFACTURING SAME

Renat Herbert Mizzoni, Chester, N.J., assignor to Ciba Pharmaceutical Products, Inc., Summit, N.J., a corporation of New Jersey No Drawing. Application June 4, 1957
Serial No. 663,351

14 Claims. (Cl. 260—293.4)

This invention relates to 2-imino-4-thiazolines, salts thereof and to the process for the preparation of such compounds. More particularly, the invention is concerned with 2-$R_1$-imino-3-$R_2$-4-$R_3$A-4-thiazolines, wherein $R_1$ and $R_2$ represent substituted aromatic lower carbocyclic radicals, $R_3$ stands for hydrogen or a tertiary amino group and A for a lower alkylene radical, salts and mixtures of such compounds.

Substituted aromatic lower carbocyclic radicals are more especially substituted phenyl or naphthyl radicals. Substituents in the aromatic nuclei contemplated are, for example, hydroxyl; lower alkyl radicals, e.g. methyl, ethyl, propyl, butyl, or pentyl; lower alkoxy radicals, e.g. methoxy, ethoxy, propyloxy, isopropyloxy, butyloxy, isobutyloxy, pentyloxy, isopentyloxy or hexyloxy; lower alkenyloxy radicals, e.g. allyloxy; oxa-lower alkoxy radicals, e.g. 3-oxa-pentyloxy; halogen atoms, e.g. chlorine or bromine; amino groups, particularly tertiary amino groups such as di-lower alkyl-amino groups, e.g. dimethyl-, diethly- or dibutyl amino; or amino-lower alkoxy groups such as di-lower alkyl-amino-lower alkoxy groups, e.g. diethyl-amino-ethoxy. The radicals $R_1$ and $R_2$ may be identical or may be different one from each other. Thus, the same or different aromatic lower carbocyclic nuclei may contain identical or different substituents, and the substituents may occupy the same or different positions in the nuclei.

A lower alkylene radical, contemplated especially for the substituent A, is, for example, the methylene, the 1,2-ethylene, the 1,2-propylene or the 1,3-propylene radical. A tertiary amino group, which may alternate with hydrogen as the substituent $R_3$, is generally a tertiary amino group the substituents of which are lower alkyl radicals, e.g. methyl, ethyl, propyl, isopropyl or butyl; lower cycloalkyl radicals, e.g. cyclopentyl, or a lower alkylene radical, which term also comprises alkyene radicals interrupted by hetero atoms such as oxygen, sulfur or nitrogen, e.g. 1,4-butylene, 1,5-pentylene, 3-aza-pentylene-(1,5) or 3-oxa-pentylene-(1,5). Preferred tertiary amino groups are, for example, dimethyl-, diethyl-, dipropyl-, diisopropyl- or dibutylamino, N-piperidino, N-pyrrolidino, N-morpholino, $N_4$-methyl-$N_1$-piperazino or $N_4$-hydroxyethyl-$N_1$-piperazino groups, or amino groups substituted by different radicals such as a methyl cyclopentyl amino group.

Lower alkyl and lower alkylene radicals which are contemplated as the various substituents or are contained as parts of substituents, have generally from 1 to 7 carbon atoms.

Salts of the compounds of this invention are particularly therapeutically useful acid addition salts such as those with inorganic and organic acids, e.g. hydrohalic acids such as hydrogen chloride or hydrogen bromide, sulfuric acid, phosphoric acids, nitric acid, thiocyanic acid, acetic acid, propionic acid, oxalic acid, malonic acid, succinic acid, malic acid, tartaric acid, citric acid, methane sulfonic acid, ethane sulfonic acid, hydroxy ethane sulfonic acid, benzene or toluene sulfonic acid, salicylic or p-amino-salicylic acid.

The new compounds are active against different types of Mycobacteria, such as *Mycobacterium tuberculosis* or *Mycobacterium leprae* and can be used as antitubercular or antileprotic agents. Most valuable, especially in view of the antitubercular activity are 2-$R_1$-imino-3-$R_2$-4-$R_3$A-4-thiazolines and salts thereof, in which $R_1$ and $R_2$ are phenyl radicals substituted by lower alkoxy, tertiary amino-lower alkoxy or tertiary amino groups, and in which $R_3$ and A represent together a methyl or a piperidinoethyl group. Thus 2-(4-lower alkoxyphenyl)-imino - 3 - (4 - lower alkoxyphenyl) - 4 - methyl - 4-thiazolines, in which the lower alkoxy group contains from 3 to 5 carbon atoms, and salts thereof, show a pronounced activity against the human pathogenic strain H37Rv of *Mycobacterium tuberculosis*. From this group I prefer the 2-imino-4-thiazoline of the formula:

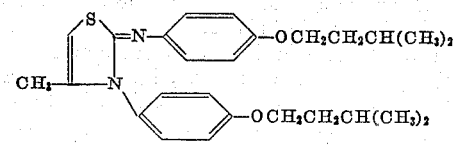

and therapeutically useful acid addition salts thereof. The following compounds may also be specifically mentioned for their outstanding antitubercular activity: 2-(4 - n - butylphenyl) - imino - 3 - (4 - n - butyl - phenyl)-4 - methyl - 4 - thiazoline, 2 - (4 - propyloxyphenyl)-imino - 3 - (4 - propyloxyphenyl) - 4 - methyl - 4 - thiazoline, 2 - (4 - butoxyphenyl) - imino - 3 - (4 - butoxyphenyl) - 4 - methyl - 4 - thiazoline, 2 - (4 - isobutoxyphenyl) - imino - 3 - (4 - butoxyphenyl) - 4 - methyl - 4-thiazoline, 2 - (4 - ethoxyphenyl) - imino - 3 - (4 - ethoxyphenyl) - 4 - β - (N - piperidino) - ethyl - 4 - thiazoline and therapeutically useful acid addition salts of such compounds. Furthermore, compounds of the 2 - phenylimino - 3 - phenyl - 4 - methyl - 4 - thiazoline type of this invention in which at least one alkyl or alkoxy radical has been replaced by a tertiary amino or a tertiary aminoalkoxy group are more easily water-soluble. Of this series of compounds the 4-thiazolines of the formulae:

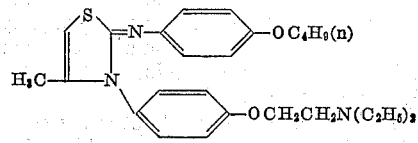

or

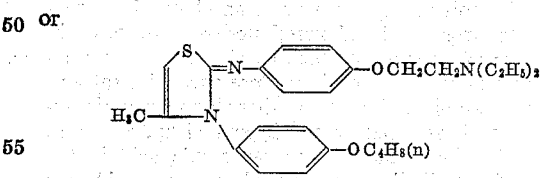

and the mixture thereof, as well as the corresponding isobutyloxy derivatives and the mixtures thereof, have especially outstanding properties with respect to watersolubility. Due to the asymmetrical structure of the thioureas used as the starting material for the preparation of such thiazolines, either one of the possible isomers or the mixture of both may be obtained in the reaction.

The new compounds may be used as medicaments in the form of pharmaceutical preparations, which contain the new compounds or salts thereof in admixture with a pharmaceutical organic or inorganic solid or liquid carrier suitable for enteral or parenteral administration. For making up the preparations there can be employed substances which do not react with the new compounds, such as water, gelatine, lactose, starches, magnesium stearate, talc, vegetable oils, benzoyl alcohols, gums, polyalkylene glycols or any other known carrier for medicaments. The pharmaceutical preparations may be, for example, in the form of tablets or dragees, or in liquid form as solutions, suspensions or emulsions. If desired, they may contain auxiliary substances, such as preserving agents, stabilizing agents, wetting or emulsifying agents, salts for varying the osmotic pressure or buffers. They may also contain, in combination, other therapeutically useful substances.

Although several methods for the manufacture of 2-imino-4-thiazolines and their salts may be conceived, a particularly suitable process consists in reacting a 1-$R_1$-3-$R_2$-2-thiourea with a methyl $R_3$A-ketone the methyl group of which is substituted by a reactive esterified hydroxyl group, and in which $R_1$, $R_2$, $R_3$ and A have the meaning given above.

1-$R_1$-3-$R_2$-2-thioureas used in this process are more especially those in which $R_1$ and $R_2$ are substituted phenyl or naphthyl radicals, the substituents of which are, for example, lower alkyl, lower alkoxy, lower alkenyloxy, oxa-lower alkoxy, amino, hydroxyl, or amino-lower alkoxy groups, or halogen atoms, such substituents having been more fully described above.

Methyl $R_3$A-ketones, which contain a reactive esterified hydroxyl group in the methyl group, especially a hydroxyl group esterified with a strong inorganic acid, such as a hydrohalic acid, e.g. hydrogen chloride, hydrogen bromide, or hydrogen iodide; or a strong organic acid such as a benzene sulfonic acid, e.g. p-toluene sulfonic acid, and in which $R_3$ stands for hydrogen or a tertiary amino group and A for a lower alkylene group, may be represented, for example, by monohalogenomethyl-$R_3$A-ketones, in which $R_3$ and A have the above meaning such as, for example, monochloroacetone, monobromoacetone, monobromomethyl ethyl ketone or monobrommethyl β-piperidinethyl-ketone. Ketones containing a basic side chain may be also used in the form of their acid addition salts, such as for example the hydrochloride or hydrobromide.

The starting materials used in this reaction are known or may be prepared according to known methods. Thus, the preparation of 1-$R_1$-3-$R_2$-2-thiourea has been described by C. F. Huebner et al., J. Am. Chem. Soc., 75, 2274 (1953), and consists generally in reacting carbon disulfide with an appropriately substituted arylamine in the presence of a catalytic amount of an alkali metal salt of an alkyl xanthate, such as potassium ethyl xanthate, or, particularly for the preparation of asymmetric thioureas, in reacting an arylisothiocyanate with an appropriately substituted arylamine.

The described reaction is carried out in the presence or absence of a solvent, at room or at an elevated temperature, in an open or closed vessel under pressure, or in the presence of an inert gas such as nitrogen. The reaction is preferably conducted in the presence of a solvent, for example, an alcohol, such as ethanol; an aromatic hydrocarbon, such as benzene; a halogenated hydrocarbon, such as chloroform; or a lower carboxylic acid in the presence of an alkali metal salt of such an acid, for example, glacial acetic acid in the presence of sodium acetate. If desired, the reaction may be completed more rapidly by refluxing the mixture for 2 to 6 hours. Any unreacted thiourea which contaminates the final product, may be identified by infrared studies or by the formation of an insoluble black precipitate upon addition of lead acetate to an alcoholic solution of the product. If necessary, the reaction may be completed by reacting the product containing any unreacted thiourea with an additional amount of the halo-ketone.

Depending on the conditions used the new compounds are obtained in the form of the free bases or salts thereof. The salts can be converted into the free bases in the customary way, e.g. by reaction with alkali. The free bases can be transformed into their therapeutically useful acid addition salts by reaction with appropriate inorganic or organic acids, e.g. the acids outlined above.

The invention also comprises any modification of the process wherein a compound obtainable as an intermediate at any stage of the process is used as starting material and the remaining step(s) of the process are carried out, as well as any new intermediates.

In the process of this invention such starting materials are preferably used which lead to final products mentioned in the beginning as preferred embodiments of the invention.

This application is a continuation-in-part of my application Serial No. 595,822, filed July 5, 1956, and of my application Serial No. 658,969, filed May 14, 1957, both now abandoned.

The following examples are intended to illustrate the invention. They are not to be construed as being limitations thereon. Temperatures are given in degrees centigrade.

*Example 1*

A mixture composed of 17 g. of 1,3-bis-(4-n-butylphenyl)-2-thiourea, 4.6 g. of chloroacetone and 200 ml. of anhydrous ethanol is refluxed for three hours. The hot solution is filtered, chilled and diluted with ether. The white solid which separates is filtered off and then recrystallized twice from a mixture of isopropanol and ether, and once from a mixture of ethanol and ether. The 2-(4-n-butylphenyl)-imino-3-(4-n-butylphenyl)-4-methyl-4-thiazoline hydrochloride (15.2 g.) is insoluble in water, but soluble in alcohol and propylene glycol, and melts at 179–180°.

*Example 2*

A mixture composed of 17 g. of 1,3-bis-(4-n-butylphenyl)-2-thiourea, 15.8 g. of 1-bromo-4-(1-piperidino)-2-butanone hydrobromide, and 200 ml. of anhydrous ethanol is refluxed for 3 hours. The hot solution is filtered and crystallized with the addition of ether. The product thus obtained is recrystallized three times from an ethanol-ether mixture, yielding 21.3 g. of 2-(4-n-butylphenyl)-imino-3-(4-n-butylphenyl)-4-β-(1-piperidino)-ethyl-4-thiazoline dihydrobromide hydrate, M. P. 213° (decomposition).

*Example 3*

A mixture composed of 19 g. of 1,3-bis-(4-ethoxyphenyl)-2-thiourea, 5.6 g. of chloroacetone and 200 ml. of anhydrous ethanol is refluxed for 3 hours. The solution is filtered and concentrated to about one-half of the original volume. A precipitate forms on the addition of ether; this is filtered and recrystallized from an ethanol-ether mixture, yielding 17.7 g. of 2-(4-ethoxyphenyl)-imino-3-(4-ethoxyphenyl)-4-methyl-4-thiazoline hydrochloride, M. P. 171–173°.

*Example 4*

A mixture composed of 19 g. of 1,3-bis-(4-ethoxyphenyl)-2-thiourea, 22.1 g. of 1-bromo-4-(1-piperidino)-butanone-2-hydrobromide and 200 ml. of anhydrous ethanol is refluxed for 2¾ hours. The filtered solution is concentrated to about 100 ml. The addition of ether causes an oil to separate; this oil upon trituration with ether yields a hydroscopic solid. 21 g. of 2-(4-ethoxyphenyl)-imino-3-(4-ethoxyphenyl)-4-β-(1-piperidino)-ethyl-4-thiazoline dihydrobromide of M. P. 140° is collected, and is very soluble in alcohol, water and propylene glycol.

*Example 5*

A mixture composed of 17.2 g. of 1,3-bis-(4-n-propyloxyphenyl)-2-thiourea, 4.6 g. of chloroacetone and 200 ml. of anhydrous ethanol is refluxed for 3 hours. The hot solution is filtered, then cooled and diluted with ether. The copious white precipitate which is formed, is filtered and then recrystallized twice from an isopropanol-ether mixture. The 2-(4-n-propyloxyphenyl)-imino-3-(4-n-propyloxyphenyl)4-methyl-4-thiazoline hydrochloride (15.2 g.), M.P. 169–170°, is soluble in water, propylene glycol and alcohol.

*Example 6*

A mixture of 17.2 g. of 1,3-bis(4-n-propyloxyphenyl)-2-thiourea, 15.8 g. of 1-bromo-4-(1-piperidino)-2-butanone hydrobromide and 200 ml. of anhydrous ethanol is refluxed for 3 hours. The hot solution is filtered, chilled and diluted with ether, yielding a white precipitate. This substance is recrystallized from a mixture of ethanol and ether, yielding 25.5 g. of 2-(4-n-propyloxyphenyl)-imino-3-(4-n-propyloxyphenyl)4-β-(1 - piperidino)-ethyl- 4-thiazoline dihydrobromide, M.P. 175–176° (decomposition). It is soluble in water, alcohol and propylene glycol.

*Example 7*

A mixture composed of 41 g. of 1,3-bis-(4-n-pentyloxyphenyl)-2-thiourea, 9.25 g. of chloroacetone and 150 ml. of chloroform is refluxed for 2¾ hours. The solution is concentrated to about 100 ml. The solid which is formed on dilution with ether, is recrystallized twice from an ethanol-ether mixture. The product (28 g.) gives a positive test for unreacted thiourea (black precipitate on addition of lead acetate to an alcoholic solution of the product); it is redissolved in 100 ml. of chloroform and refluxed with an additional 6.5 g. of chloroacetone for 3 hours. The product of this reaction gives a negative test for the presence of thiourea. This substance is converted to the base by refluxing with 19 g. of sodium acetate in 300 ml. of ethanol. The base separates out on evaporating and chilling; it is recrystallized from aqueous methanol yielding 13 g. of 2-(4-n-pentyloxyphenyl)-imino-3-(4 - n-pentyloxyphenyl) - 4- methyl-4-thiazoline, M.P. 68–69°.

*Example 8*

A mixture composed of 24 g. of 1,3-bis-(4-isopentyloxyphenyl)2-thiourea, 5.6 g. of monochloroacetone and 200 ml. of anhydrous ethanol is refluxed for three hours, and the hot solution is filtered. Crystallization is induced by addition of ether to the solution and refrigeration. The solid thus obtained is recrystallized three times from an isopropanol-ether mixture. 21 g. of 2-(4-isopentyloxyphenyl)-imino-3-(4 - isopentyloxyphenyl)-4-methyl-4-thiazoline hydrochloride, melting at 180–181°, are obtained.

*Example 9*

A mixture composed of 20 g. of 1,3-bis (4-isopentyloxyphenyl)-2-thiourea, 15.8 g. of 1-bromo-4-(1-piperidino)-2-butanone hydrobromide and 200 ml. of anhydrous ethanol is refluxed for 3 hours and then filtered hot. Crystallization of the product is effected by adding ether to the solution and chilling. The substance thus derived is recrystallized twice from a mixture of anhydrous ethanol and ether, yielding 25.6 g. of 2-(4-isopentyloxyphenyl)-imino-3-(4-isopentyloxyphenyl)-4 - β - (N-piperidino)-ethyl-4-thiazoline dihydrobromide, M.P. 184° (decomposition).

*Example 10*

A mixture composed of 43 g. of 1,3-bis-(4-n-hexyloxyphenyl)-2-thiourea, 9.3 g. of monochloroacetone and 150 ml. of chloroform is allowed to reflux for 3 hours. The chloroform is removed by distillation. A white solid separates on addition of ether. The solid is recrystallized from a mixture of isopropanol and ether, yielding 21 g. of the crude hydrochloride. The free base is formed by dissolving the salt in 200 ml. of anhydrous ethanol and refluxing for 2 hours with 11 g. of anhydrous sodium acetate. The hot solution is filtered and concentrated. A solid is obtained on refrigeration, which is taken up in ether, the solution is filtered, evaporated to dryness, and the residue purified by recrystallization from a mixture of methanol and water. The resulting base, 2-(4-n-hexyloxyphenyl)-imino-3-(4-n-hexyloxyphenyl)-4-methyl-4-thiazoline melts at 63–64°.

*Example 11*

A mixture composed of 17 g. of 1,3-bis-(4-allyloxyphenyl)-2-thiourea and 4.6 g. of monochloroacetone is dissolved in 200 ml. of anhydrous ethanol and refluxed for 3 hours. The solution is distilled to one-third of its original volume. White crystals separate on the addition of ether. The solid thus derived is recrystallized from a mixture of anhydrous ethanol and ether, yielding 16.5 g. of 2-(4-allyloxyphenyl)-imino-3-(4-allyloxyphenyl)-4-methyl-4-thiazoline hydrochloride monohydrate, M.P. 175–177°.

*Example 12*

A mixture composed of 15.8 g. of 1-bromo-4-(1-piperidino)-2-butanone hydrobromide, 17 g. of 1,3-bis-(4-allyloxyphenyl)-2-thiourea and 200 ml. of anhydrous ethanol is refluxed for 3 hours. The hot solution is filtered, diluted with ether and refrigerated; there is obtained 16.8 g. of a solid. This material is twice recrystalized from a mixture of ethanol and ether, yielding 14 g. of 2-(4-allyloxyphenyl)-imino-3-(4-allyloxyphenyl) - 4 - β - (N-piperidino)-ethyl - 4 - thiazoline dihydrobromide, M.P. 210–212° (decomposition).

*Example 13*

A mixture of 13.5 g. of 1,3-bis-(4-n-butyloxyphenyl)-2-thiourea, 3.4 g. of monochloroacetone and 125 ml. of anhydrous ethanol is refluxed for 3¼ hours. The hot solution is filtered, ether is added and the resulting crystals filtered off. The 2-(4-n-butyloxyphenyl)-imino-3-(4-n-butyloxyphenyl)-4-methyl-4-thiazoline hydrochloride is recrystallized twice from a mixture of isopropanol and ether, M.P. 170–173°.

*Example 14*

A solution of 13.9 g. of 1,3-bis-(4-isobutyloxyphenyl)-2-thiourea and 3.5 g. of monochloroacetone in 125 ml. of anhydrous ethanol is refluxed for 4¼ hours and filtered hot. Upon addition of ether the 2-(4-isobutyloxyphenyl)-imino-3-(4-isobutyloxyphenyl)-4-methyl-4-thiazoline hydrochloride precipitates and is recrystallized from a mixture of isopropanol and ether, M.P. 209–210°.

*Example 15*

A mixture of 20 g. of 1,3-bis-(4-isopentyloxyphenyl)-2-thiourea and 16.6 g. of 1-bromo-4-dipropylamino-2-butanone hydrobromide in 250 ml. of anhydrous ethanol is refluxed for 3 hours. After filtration and addition of ether the hygroscopic hydrobromide salt precipitates which is dissolved in chloroform. To the chloroform solution is added an aqueous solution of sodium hydroxide and the base is recovered by evaporation of the solvent from the separated chloroform layer. The residue is dissolved in ether, hydrogen chloride gas passed through the solution, and the isolated crude 2-(4-isopentyloxyphenyl)-imino - 3(4-isopentyloxy - phenyl)-4-β-dipropyl-amino-ethyl-4-thiazoline dihydrochloride melts at 127–133° C.

*Example 16*

A mixture of 9.2 g. of chloroacetone and 19 g. of 1-(4 - dimethylaminophenyl)-3-(4-n-butoxyphenyl)-2-thiourea in 250 ml. of anhydrous ethanol is refluxed for 3 hours on the steam bath. After cooling ether is added and the 2-[4-dimethylamino (or n-butoxy)phenyl]-imino-3-[4-n-butoxy(or dimethylamino)phenyl]-4-methyl-4-thiazoline hydrochloride is recrystallized from a mixture of isopropanol and methanol, M.P. 215.5–216° (decomposition). Because of the symmetrically substituted thiourea derivative used as the starting material, two different products could theoretically be formed, however only one homogenous product was isolated.

Example 17

A mixture of 45.2 g. of 1-(4-diethylaminoethoxyphenyl)-3-(4-isobutyloxyphenyl)-2-thiourea and 9.4 g. of chloroacetone in 250 ml. ethanol is refluxed for 19 hours. The solution is concentrated to a small volume under reduced pressure, and upon addition of ether an oil separates. The oil is dissolved in isopropanol and the solution is filtered. An amorphous solid separates on addition of ether and the hygroscopic, amorphous mixture of the dihydrochlorides of 2-(4-diethylaminoethoxyphenyl)-imino-3-(4-isobutyloxy-phenyl)-4-methyl-4-thiazoline and 2-(4-isobutyloxy-phenyl)-imino-3-(4-diethylaminoethoxyphenyl)-4-methyl-4-thiazoline is filtered off which shows not a definite melting point, but softens at about 60°.

Example 18

A mixture of 45.2 g. of 1-(4-diethylaminoethoxyphenyl)-3-(4-n-butyloxyphenyl)-2-thiourea and 9.4 g. of chloroacetone in 300 ml. ethanol is refluxed for 15 hours. The solution is concentrated to a small volume under reduced pressure, and upon addition of ether an oil separates. The oil is dissolved in isopropanol and the solution is filtered. A solid separates on addition of ether and the mixture of the dihydrochlorides of 2-(4-diethylaminoethoxy-phenyl)-imino-3-(4-n-butyloxy-phenyl)-4-methyl-4-thiazoline and 2-(4-n-butyloxy-phenyl)-imino-3-(4-diethylaminoethoxy-phenyl)-4-methyl-4-thiazoline is filtered off.

What is claimed is:

1. A member of the group consisting of a 2-$R_1$-imino-3-$R_2$-4-$R_3$A-4-thiazoline, wherein $R_1$ and $R_2$ stand for phenyl radicals substituted in the para position by a member of the group consisting of lower alkyl, lower alkoxy, lower alkenyloxy, oxa-lower alkoxy, di-lower alkyl amino, and di-lower alkyl amino-lower alkoxy, $R_3$ represents a member of the group consisting of hydrogen, di-lower alkyl-amino, N-methyl-N-cyclopentyl-amino, pyrrolidino, piperidino, morpholino, $N_4$-methyl-piperazino and $N_4$-hydroxyethyl-piperazino, and A stands for a lower alkylene radical, and therapeutically acceptable acid addition salts.

2. 2-(4-lower-alkoxy-phenyl)-imino-3-(4-lower alkoxy-phenyl)-4-lower alkyl-4-thiazoline, the lower alkoxy groups of which contain from 3 to 5 carbon atoms.

3. 2-(4-lower alkoxy-phenyl)-imino-3-(4-lower alkoxy-phenyl)-4-di-lower alkyl amino-lower alkyl-4-thiazoline, the lower alkoxy groups of which contain from 3 to 5 carbon atoms.

4. 2-(4-butyloxyphenyl)-imino-3-(4-butyloxyphenyl)-4-methyl-4-thiazoline.

5. 2-(4-isopentyloxyphenyl)-imino-3-(4-isopentyloxyphenyl)-4-methyl-4-thiazoline.

6. A therapeutically useful acid addition salt of the compound of claim 5.

7. The hydrochloride of the compound of claim 5.

8. 2-(4-isopentyloxyphenyl)-imino-3-(4-isopentyloxyphenyl)-4-$\beta$-dipropylamino-ethyl-4-thiazoline.

9. 2-(4-isopentyloxyphenyl)-imino-3-(4-isopentyloxyphenyl)-4-$\beta$-(1-piperidino)-ethyl-4-thiazoline.

10. The mixture of the hydrochlorides of 2-(4-diethylaminoethoxy-phenyl)-imino-3-(4-isobutyloxyphenyl)-4-methyl-4-thiazoline and 2-(4-isobutyloxyphenyl)-imino-3-(4-diethylaminoethoxy-phenyl)-4-methyl-4-thiazoline.

11. The mixture of the hydrochlorides of 2-(4-n-butyloxyphenyl)-imino-3-(4-diethylaminoethoxy-phenyl)-4-methyl-4-thiazoline and 2-(4-diethylaminoethoxy-phenyl)-imino-3-(4-n-butyloxyphenyl)-4-methyl-4-thiazoline.

12. In a process for the preparation of a member of the group consisting of a 2-$R_1$-imino-3-$R_2$-4-$R_3$A-4-thiazoline, wherein $R_1$ and $R_2$ stand for phenyl radicals substituted in the para position by a member of the group consisting of lower alkyl, lower alkoxy, lower alkenyloxy, oxa-lower alkoxy, di-lower alkyl amino and di-lower alkyl amino-lower alkoxy, $R_3$ represents a member of the group consisting of hydrogen, di-lower alkyl-amino, N-methyl-N-cyclopentylamino, pyrrolidino, piperidino, morpholino, $N_4$-methyl-piperazino and $N_4$-hydroxyethyl-piperazino, and A stands for a lower alkylene radical, and therapeutically acceptable acid addition salts thereof, the step which comprises contacting at elevated temperature 1-$R_1$-3-$R_2$-2-thiourea with a methyl $R_3$A-ketone, the methyl group of the formula

wherein each of $R_4$ and $R_5$ are members of the group consisting of lower alkyl, cycloalkyl, oxacycloalkyl, azacycloalkyl and thiacycloalkyl of which is substituted by a halogen atom, and in which starting materials $R_1$, $R_2$, $R_3$ and A have the above given meaning.

13. A process for the preparation of the hydrochloride of 2-(4-isopentyloxyphenyl)-imino-3-(4-isopentyloxyphenyl)-4-methyl-4-thiazoline, which comprises treating at elevated temperature monochloroacetone with 1,3-bis-(4-isopentyloxyphenyl)-2-thiourea.

14. The mixture of the dihydro-chlorides of 2-(4-diethylaminoethoxy-phenyl)-imino-3-(4-n-butyloxy-phenyl)-4-methyl-4-thiazoline and 2-(4-n-butyloxy-phenyl)-imino-3-(4-diethylaminoethoxy-phenyl)-4-methyl-4-thiazoline.

References Cited in the file of this patent
UNITED STATES PATENTS
2,784,196    Bacchetti _____ Mar. 5, 1957

UNITED STATES PATENT OFFICE
CERTIFICATE OF CORRECTION

Patent No. 2,910,478 October 27, 1959

Renat Herbert Mizzoni

It is hereby certified that error appears in the printed specification of the above numbered patent requiring correction and that the said Letters Patent should read as corrected below.

Column 2, lines 54 to 56, the lower right-hand portion of the formula should appear as shown below instead of as in the patent:

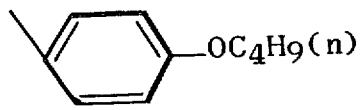

column 3, lines 35 and 36, for "monobrommethyl β-piperidinethyl" read -- monobromomethyl β-piperidinoethyl --; column 5, lines 2 and 13, for "-(4-n-propyloxyphenyl)4-", each occurrence, read -- -(4-n-propyloxyphenyl)-4- --; line 40, for "oxyphenyl)2-" read -- oxyphenyl)-2- --; line 50, for "1,3-bis (4-" read -- 1,3-bis-(4- --; column 6, line 59, for "3(4-" read -- 3-(4- --.

Signed and sealed this 6th day of September 1960.

(SEAL)
Attest:

ERNEST W. SWIDER
Attesting Officer

ROBERT C. WATSON
Commissioner of Patents